(12) United States Patent
Linhardt

(10) Patent No.: US 7,870,297 B1
(45) Date of Patent: Jan. 11, 2011

(54) ORGANIZING COMPUTER NETWORK IDENTIFICATIONS AND CONCURRENT APPLICATION OF POLICY SELECTORS

(75) Inventor: Peter Linhardt, Malibu, CA (US)

(73) Assignee: Symantec Corporation, Mountain View, CA (US)

( * ) Notice: Subject to any disclaimer, the term of this patent is extended or adjusted under 35 U.S.C. 154(b) by 1232 days.

(21) Appl. No.: 10/826,468

(22) Filed: Apr. 16, 2004

(51) Int. Cl.
G06F 15/16 (2006.01)
G06F 15/173 (2006.01)

(52) U.S. Cl. ................................ 709/250; 709/224

(58) Field of Classification Search .................. 709/250
See application file for complete search history.

(56) References Cited

U.S. PATENT DOCUMENTS

| | | | | |
|---|---|---|---|---|
| 5,794,224 | A * | 8/1998 | Yufik | 706/14 |
| 7,000,015 | B2 * | 2/2006 | Moore et al. | 709/224 |
| 2004/0268150 | A1 * | 12/2004 | Aaron | 713/201 |

OTHER PUBLICATIONS

Pop-Up Stopper Professional [Online] Apr. 22, 2005, [Retrieved from the Internet on Apr. 22, 2005] Retrieved from the Internet: <URL: http://www.panicware.com/index.html>, Seattle, WA.
AdsCleaner v 4.3 for Windows NT/2000/XP, [Online] Apr. 22, 2005 [Retrieved from the Internet on Apr. 22, 2005] Retrieved from the Internet: <URL: http://www.adscleaner.com>.
AntiTracer: Unwanted Pop-ups and other Advertisements, [Online] Apr. 22, 2005, [Retrieved from the Internet on Apr. 22, 2005] Retrieved from the Internet: <URL: http://www.antitracer.com/popup_killer.html>, Dublin, IE.
Sabin, Todd, "Comparing binaries with graph isomorphisms", downloaded from http://www.bindview.com/Services/Razor/Papers/2004/comparing_binaries.cfm, Jan. 17, 2006, Cupertino, CA.
Flake, Halvar, "Automated Reverse Engineering" Black Hat Windows 2004, downloaded from http://www.blackhat.com/html/bh-media-archives/bh-archives-2004.html, Jan. 17, 2006, Seattle, WA.
"Gold Parser, A Free Multi-Platform Parser Generator", [online] devincook.com [retrieved Oct. 7, 2003] Retrieved from the Internet: <URL: http://www.devincook.com/goldparser/index.htm>.
"RFC 2821—Simple Mail Transport Protocol", Klensin J., editor, Apr. 2001, [online] Faqs.org [retrieved Oct. 13, 2003] Retrieved from the Internet: <URL: http://www.faqs.org/rfcs/rfc2821.html>.

* cited by examiner

*Primary Examiner*—Hassan Phillips
*Assistant Examiner*—Joseph Greene
(74) *Attorney, Agent, or Firm*—Fenwick & West LLP

(57) ABSTRACT

Methods, apparati, and computer-readable media for associating computer network identifications with network policies. A plurality of network detectors (3) are coupled to a client computer (1). A network probe (4), coupled to the network detectors (3), associates each network identification revealed by a network detector (3) with a netspec. A netspec database (6), coupled to the network probe (4), associates netspecs with locations. A policy guide (8), coupled to the network probe (4), associates network identifications with locations. A network interface module (9), coupled to the policy guide (8), implements network policies based upon locations.

19 Claims, 3 Drawing Sheets

FIREWALL 9 SETTINGS

|  | TRUSTED COMPUTERS | TRUSTED NETWORKS | TRUSTED PROGRAMS |
|---|---|---|---|
| LOCATION 1 | ABC | all | all |
| LOCATION 2 | DEF | Internet | Internet Explorer |
| LOCATION 3 | A | Enterprise LAN | Outlook e-mail |

LOCATIONS

FIG. 3

ORGANIZING COMPUTER NETWORK IDENTIFICATIONS AND CONCURRENT APPLICATION OF POLICY SELECTORS

TECHNICAL FIELD

This invention pertains to the field of acquiring and managing classifications of computer networks and applying network identifications to the selection of polices in a firewall or other network interface component.

BACKGROUND ART

With the high proliferation of notebook and other portable computers, it is becoming common for a computer to be connected to the Internet and other networks from different access points at different times. In addition, single computers can be equipped with multiple network devices operating on different media, each with an independent path to the Internet. For example, a single computer may be equipped with a LAN device, a wireless device, a telephone modem interface, and other network devices, some or all of which can be operated simultaneously.

The level of security required to safely conduct network communications may vary, depending upon the method of access being used. It would be beneficial for the end user to restrict access to interfaces to just those specific applications and services that require those interfaces, thus preventing misuse of those interfaces. For example, a user may wish to share data freely on private Web pages in his or her office environment LAN, but not want this access granted to connections from wireless or telephony sources.

Many vendors have implemented so-called location awareness features that address this need to some extent. Typically, the system is assigned a global state that represents the system's "location", and this state is used to select policy settings. This approach does not allow for the possibility that multiple connections can be active at the same time, nor for the application of separate policies for simultaneous connections on different interfaces.

Location awareness features often allow user selection of the specific metric used to identify location (such as gateway, domain, DHCP server, etc.). However, these features do not integrate multiple methods for concurrent use.

What is needed is a means for allowing a user to integrate and manage multiple methods for establishing policy selectors, and to simultaneously assign a different selector to each interface on the system. The present invention accomplishes this, by allowing distinct policies to be applied separately to each data packet entering or leaving the user's computer, depending upon the interface used.

DISCLOSURE OF INVENTION

Methods, apparati, and computer-readable media for associating computer network identifications with network policies. A plurality of network detectors (3) are coupled to a client computer (1). A network probe (4), coupled to the network detectors (3), associates each network identification revealed by a network detector (3) with a netspec. A netspec database (6), coupled to the network probe (4), associates netspecs with locations. A policy guide (8), coupled to the network probe (4), associates network identifications with locations. A network interface module (9), coupled to the policy guide (8), implements network policies based upon locations.

BRIEF DESCRIPTION OF THE DRAWINGS

These and other more detailed and specific objects and features of the present invention are more fully disclosed in the following specification, reference being had to the accompanying drawings, in which:

FIG. 3 is a table illustrating the relationship between locations and settings within a firewall 9.

DETAILED DESCRIPTION OF THE PREFERRED EMBODIMENTS

Figure 1:
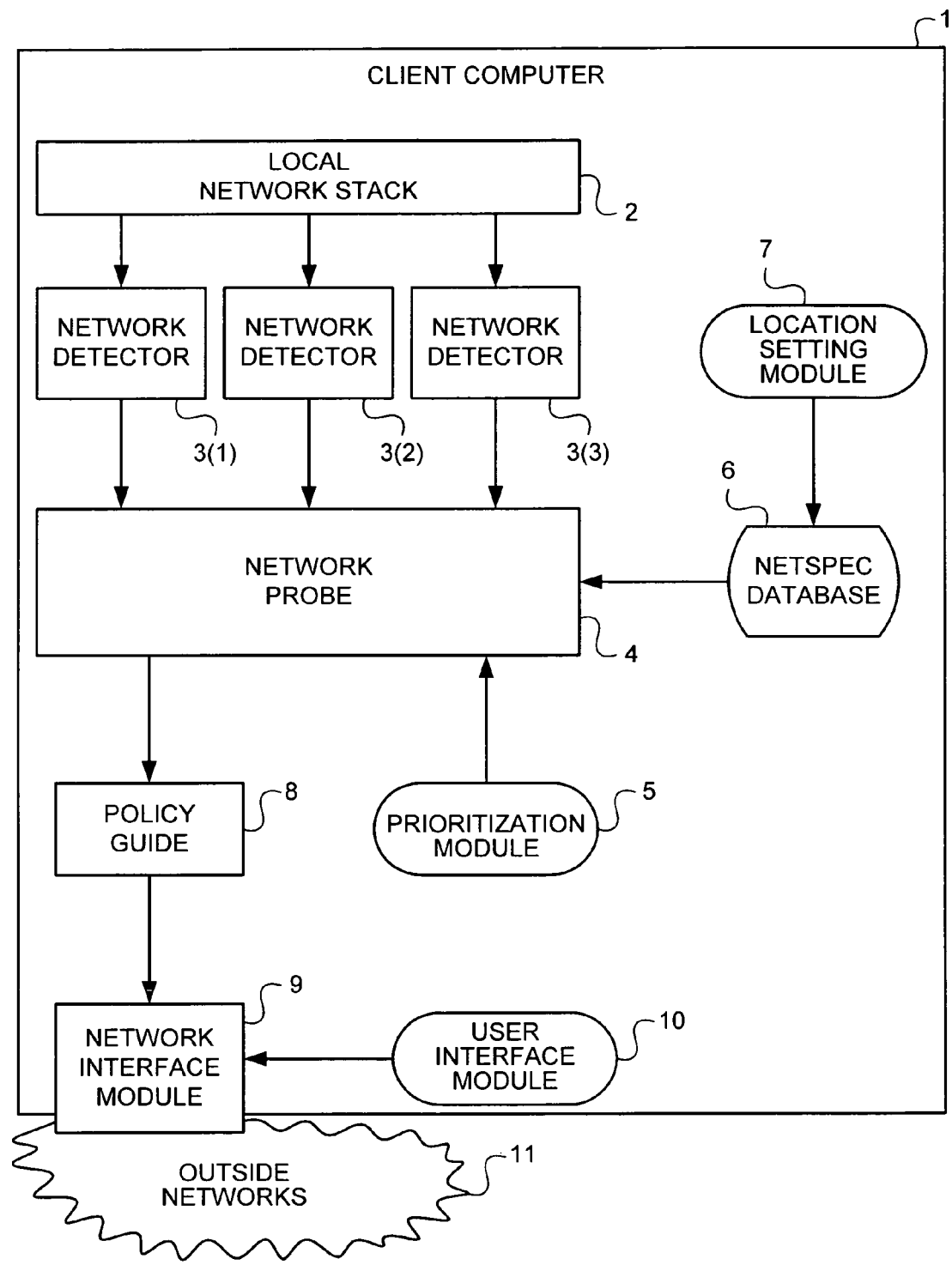
FIG. 1 is a block diagram illustrating apparatus suitable for carrying out the present invention.

FIG. 1 illustrates apparatus suitable for carrying out the present invention. A client computer 1, which includes a processor and which may be a desktop computer or a portable computer such as a notebook computer or a hand-held PDA (Personal Digital Assistant), contains several network connections, i.e., means for connecting to one or more outside networks 11, such as the Internet, an enterprise LAN (Local Area Network) or WAN (Wide Area Network), etc. These connections to outside networks 11 are typically made through a network interface module 9, which can be a firewall, a router, a sniffer, an intrusion detection module, a behavior blocking module, and/or any other type of network communications module.

Associated with client computer 1 is a local network stack 2, software that manages all of the network connections of client computer 1. Stack 2 typically comprises a plurality of system API's (Application Program Interfaces). Coupled to local network stack 2 are a plurality of network detectors 3. As used throughout this specification including claims, "coupled" refers any direct or indirect communicative coupling. FIG. 1 illustrates three network detectors 3, but there can be any finite number of them. Each network detector 3 is a module that can identify a particular network interface of computer 1 using a particular technology or system API.

Each input to a network detector 3 is a network interface (connection) specified by Internet Protocol (IP) address. The output of each detector 3 is a pair of tokens, which together are called the netspec (network specification) of that network interface. The first token is a detector token having a static value that identifies the specific detector 3 that created the netspec. Examples of suitable detectors 3 are Local IP, Gateway IP, Gateway MAC, DNS IP, Wireless SSID, and Dialup. The second token is a value that the particular detector 3 uses to uniquely identify the network interface. The first token specifies the domain of the second token.

Table 1 below illustrates various netspecs that can be produced by various detectors 3.

TABLE 1

| NetSpec Type | First Token | Argument | Example of Second Token |
|---|---|---|---|
| Gateway MAC Address | GATEMAC | hex representation | 00 11 22 33 44 55 |
| Gateway IP Address | GATEIP | IP address | 10.20.30.40 |
| Dialup Number | DIALNUM | phone number | (888) 555-1212 |
| Dialup Entry Name | DIALENTRY | string | Earthlink |
| Service Set Identifier | SSID | string | LINKSYS_DEFAULT |

TABLE 1-continued

| NetSpec Type | First Token | Argument | Example of Second Token |
|---|---|---|---|
| Subnet Address/Mask | SUBNET | IP and mask | 192.168.1.0/ 255.255.255.0 |
| Interface Type | IFTYPE | string* | Ethernet |
| Interface Description | IFDESC | string | Local Area Connection |
| Interface Index | IFINDEX | hex number | 10003 |
| Domain | DOMAIN | domain | yahoo.com |
| Other (not currently used) | OTHER | reserved | |
| Reserved Location** | RESV | string | Work |

*one of: "Ethernet", "Tokenring", "FDDI", "PPP", "Loopback", "SLIP",
**not detected on network; used to reserve location identifier Network probe 4 is a module that gathers identification information for each network connection in every way possible, and sorts this identification information into priority order. In one embodiment, network probe 4 periodically polls each detector 3 for a netspec that applies to each network interface that can be detected by that detector 3. In an alternative embodiment, network probe 4 responds to signals emanating from the detectors 3. The signals correspond to information about network connections that detectors 3 have gathered. Network probe 4 assembles a data structure (network interface list), illustrated in the left three columns of the below Table 2, consisting of all the netspecs that apply to each active network interface. Not all detectors 3 are able to supply a netspec for a particular network interface. For example, a dialup detector that identifies connections with phone numbers is not able to identify a LAN interface.

TABLE 2

| Network Interface Entry | Local IP Address | Observed NetSpec | Configured NetSpec | Location Identifier |
|---|---|---|---|---|
| 1 | 1.2.3.4 | GATEMAC 001E2B... | GATEMAC 001E2B... | 1 |
| 2 | 10.11.12.13 | DOMAIN SYMCORP | DOMAIN SYMCORP | 1 |
| 3 | 10.11.12.14 | GATEIP 10.20.30.40 | GATEIP 10.20.30.40 | 2 |
| 4 | 10.11.12.14 | SUBNET 30.31.32.0/8 | SUBNET 30.31.32.0/8 | 2 |
| 5 | 10.11.12.14 | DIALNUM 310-449-4100 | DIALNUM 310-449-4100 | 2 |
| 6 | 10.11.12.14 | SSID Hawaii | SSID Hawaii | 2 |
| | | {entries within network probe 4} | {entries within netspec database 6} | |

In Table 2, it can be seen that each detected network interface is assigned an arbitrary consecutive number (1 to 6 in the illustrated example). Each network interface is uniquely identified by its local IP address in the second column of Table 2. The third column of Table 2 gives the netspec that a detector 3 has observed for that network interface. Table 2 illustrates six network interface entries, but only three unique network interfaces. Entries 3 through 6 represent the results of four different detectors 3 having detected the same network interface, one having a local IP address of 10.11.12.14.

In one embodiment, network probe 4 sorts the observed netspecs in a priority order on the basis of the detectors 3 that performed the observations. The prioritization can be based upon the fact that some detectors 3 are more reliable in observing certain network connections, and therefore it is deemed that these detectors 3 should be awarded priority. The priority order by which detectors 3 are associated with network connections can be fed to network probe 4 by a prioritization module 5 associated with network probe 4. Prioritization module 5 can contain a user interface so that a human user of client computer 1 can easily set or change the priorities.

Netspec database 6 is a table showing the correspondence between netspecs and location identifiers. Thus, for each network interface entry, netspec database 6 contains two columns, illustrated as columns 4 and 5 in Table 2. Entries in the 4th column are identical to those observed netspecs captured by network probe 4 (as entered in column 3 of Table 2). The fifth column of Table 2 gives location identifiers associated with each of the netspecs. Location identifiers are user assigned selectors that correspond to a particular desired policy set. Network interface module 9 uses these location identifiers to select specific rules (policies) that the user wishes to apply to particular network connections. Table 2 illustrates two different location identifiers, 1 and 2. Location 1 may correspond to "home", i.e., the computer 1 is being used at the user's home, while location identifier 2 may correspond to "work", i.e., the computer 1 is being used at the user's work. Other examples of location can be "school", "travel", "guest", etc.

Location identifiers can be assigned to specific netspecs via location setting module 7 coupled to netspec database 6. Location setting module 7 may contain a user interface by which the user assigns a location to each netspec or changes an existing location. If no location has been assigned to a certain netspec, a unique location identifier, such as a −1 (minus 1) can be used to indicate the fact that the location is unassigned. In this embodiment, location setting module 7 can be configured to ask the user, e.g., via a pop-up window appearing on a display associated with computer 1, for a location identifier to assign to that particular netspec. The user then tells location setting module 7 which location the user wishes to assign to that netspec. Similarly, the user can change the location associated with a given netspec at any time, by informing location setting module 7 of the new location that the user wishes to assign.

Network probe 4 provides (downloads) the correlation between the network connection (as identified by local IP address) and location (as given by the numerical location identifier) to policy guide 8, a module which in turn feeds this information to network interface module 9 in real time. In one embodiment, network probe 4 simply selects the highest priority netspec for the particular network interface and looks up the corresponding location identifier in netspec database 6. In an alternative embodiment, network probe 4 considers more than one netspec (for those network interfaces that have more than one netspec) before deciding which location identifier to provide to policy guide 8, according to a pre-established algorithm.

For each network connection, network interface module 9 requests policy guide 8 to provide network interface module 9 with the associated location identifier. In the case where network interface module 9 is a firewall, this information can be provided from policy guide 8 to firewall 9 for each packet of data that enters or leaves computer 1 via firewall 9. The locations are correlated with firewall settings on a distributed basis within firewall 9. This is illustrated in FIG. 3, which shows three locations, identified as location 1, location 2, and location 3; and three types of firewall settings: trusted computers, trusted networks, and trusted programs. In the example illustrated in FIG. 3, firewall 9 has been configured to implement three sets of network policies corresponding to the three locations. For location 1, firewall 9 will allow communications between computer 1 and only computers A, B, and C; will allow these communications regardless of what network computers A, B, and C are part off and will allow these communications regardless of which program is being used. For location 2, firewall 9 will allow communications between computer 1 and only computers D, E, and F; only when one of these computers D, E, F is part of the Internet; and only when the program Internet Explorer is being used. For location 3, firewall 9 will allow computer 1 to communicate only with computer A; only over the enterprise LAN; and only using the e-mail program known as Outlook.

A user interface module 10 coupled to network interface module 9 allows a user of computer 1 to change the correlations between location identifiers and network interface module 9 settings, thereby changing the corresponding network policies.

Modules 3 through 10 can be implemented in software, hardware, firmware, or any combination thereof. When implemented in software, modules 3 through 10 can reside on a computer storage readable medium or on a plurality of computer readable storage media, such as one or more floppy disks, hard disks, CDs, DVDs, etc.

Let us now illustrate the above principles of the present invention by providing an example. In this example, computer 1 has two network interfaces: a wireless interface and a LAN interface. Network probe 4 enumerates the IP addresses of these two interfaces by polling the available detectors 3. Let us assume that there are two detectors 3: a first detector 3(1) that detects the gateway MAC address and a second detector 3(2) that detects wireless SSIDs. For the wireless network interface, both detectors 3(1), 3(2) acquire information pertaining to the interface, and deliver this information to network probe 4. The gateway MAC detector 3(1) delivers a netspec consisting of a gateway MAC token and the numeric value of the gateway MAC address. The wireless SSID detector 3(2) delivers a netspec consisting of an SSID token and the string representation of the currently active SSID.

For the LAN network interface, the gateway MAC detector 3(1) succeeds and returns a netspec. However, the wireless SSID detector 3(2) fails to acquire an SSID, since this metric does not apply to LAN interfaces.

Network probe 4 thus produces a network interface list where each interface is stored with its own collection of netspecs. This is shown in the below table:

| | OBSERVED NETSPEC | |
|---|---|---|
| IP ADDRESS | TOKEN 1 | TOKEN 2 |
| 10.20.30.40 | SSID | Lynksys1 |
| | Gateway MAC | 00-00-11-22-33-44 |
| 20.30.40.50 | Gateway MAC | 00-00-22-33-44-55 |

The netspecs are sorted according to a user specified identification priority. Once the above table is assembled, netspec database 6 is consulted by network probe 4 to find a corresponding location identifier for each network interface. In this example, netspec database 6 may consist of the following:

| CONFIGURED NETSPEC | | LOCATION |
|---|---|---|
| TOKEN 1 | TOKEN 2 | IDENTIFIER |
| SSID | Lynksys1 | 1 (home wireless) |
| Gateway MAC | 00-00-11-22-33-44 | 1 (home wireless) |
| Gateway MAC | 00-00-22-33-44-55 | 2 (office LAN)_ |

The above items are matched by network probe 4 with the preferred netspecs from the above netspec database 6, resulting in a location table that network probe 4 downloads to policy guide 8 as follows:

| IP ADDRESS | LOCATION IDENTIFIER |
|---|---|
| 10.20.30.40 | 1 (home wireless) |
| 20.30.40.50 | 2 (office LAN) |

Let us assume that, in this example, network interface module 9 is a firewall. The firewall 9 policies are selected according to the location identifiers provided to firewall 9 by policy guide 8. For instance, let us assume that the user of computer 1 wants to restrict a local Web server 1 to honor requests that emanate only from the user's office LAN but not from wireless sources. An incoming request packet arrives at firewall 9 from a wireless source and has a destination address of 10.20.30.40. By consulting policy guide 8, firewall 9 determines that the request is associated with location identifier 1, which represents the wireless interface. This identifier is then used to select a firewall 9 policy that blocks the request.

Figure 2:
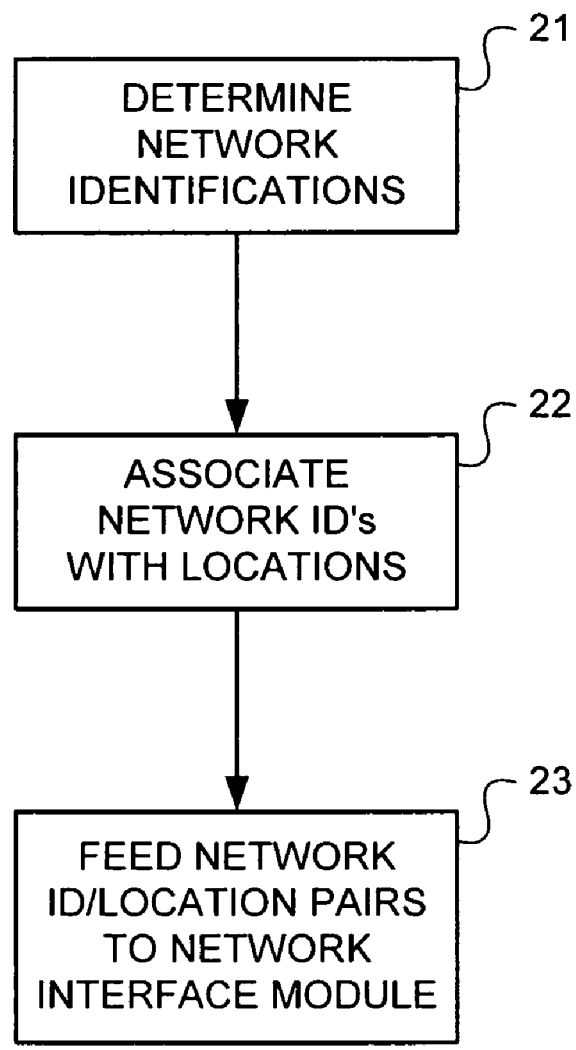
FIG. 2 is a flow diagram illustrating a method embodiment of the present invention.

An exemplary method embodiment of the present invention is now described in conjunction with FIG. 2. Let us assume that client computer 1 is a laptop, and network interface module 9 is a firewall. User Joe turns on his laptop 1, installs firewall 9, and configures the firewall 9 settings. A pop-up window appears on the display of laptop 1 asking Joe whether he wishes to activate the present invention by means of activating the network detectors 3 associated with laptop 1. In an optional step, Joe is asked whether he wishes to prioritize detectors 3, so that, for subsequent steps there will be just one detector 3 associated with one network connection. At this time, Joe can also select which detectors 3 are allowed to be considered for which network connectors. Joe may not wish for all of the detectors 3 to be used for all possible network connectors, because he may consider some detectors 3 to be less reliable than others.

If Joe decides to activate the network detectors 3, modules 3,4 perform step 21, during which the network connections of laptop 1 are determined. Network detectors 3 look for network connections, and network probe 4 periodically polls the detectors 3 to see whether a physical network connection has changed, a VPN (Virtual Private Network) has changed, etc. The polling may be performed every n seconds, where n is preselected by Joe. n can be modified, e.g., by Joe changing this parameter via prioritization module 5.

As a result of step 21, network probe 4 produces a table of observed netspecs. For each new netspec (i.e., a netspec that doesn't have an associated location), Joe is asked to identify the netspec with a location. He does this via location setting module 7. Netspec database 6 can contain predefined default locations (such as "home, "office", "away") for some or all netspecs. The predefined locations have policies associated with them, embodied in firewall 9. For each non-predefined location, Joe is asked to define the set of policies that he wishes to associate with the location identifier. Joe provides this information to firewall 9 via user interface module 10. This process can be facilitated using a wizard software module associated with user interface module 10. The wizard walks Joe through the policy, setting by setting. The correlation between locations and policies is distributed throughout firewall 9.

Joe is allowed to reassign a location to a netspec at any time via location setting module 7. Joe is also allowed to reassign a policy to a location at any time via user interface module 10.

At step 22, network probe 4 associates network identifications with locations, and presents this information to policy guide 8.

At step 23, policy guide 8 feeds network identification/location pair information to firewall 9 on a real-time packet-by-packet basis. In turn, firewall 9 uses this information to determine which packets are allowed to and from laptop 1, thereby implementing the network policies desired by Joe.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for associating computer network interfaces with network policies, said method comprising the steps of:
   analyzing one or more network interfaces associated with a client computer using a plurality of network detectors that each output a netspec comprising a first token that is a detector token having a static value that identifies a specific detector that created the netspec and a second token that is a value that the specific detector uses to uniquely identify the analyzed network interface;
   determining that a first detector outputted a first netspec for a particular analyzed network interface of the one or more network interfaces and that a second detector outputted a second netspec for the particular analyzed network interface;
   determining that the first detector is more reliable in observing the particular analyzed network interface than is the second detector;
   awarding a higher priority to the first netspec than to the second netspec in response to the first netspec being output by the first detector and the first detector being more reliable than the second detector;
   associating the first netspec that was awarded the higher priority with a location that is linked to one or more network policies designated by a user to be implemented for the location; and
   feeding the associated netspec/location pair to a network interface module to implement the one or more network policies designated for the location.

2. The method of claim 1 wherein the network interface module is a module from the group of modules consisting of a firewall, a router, a sniffer, an intrusion detection module, a behavior blocking module, and a network communications module.

3. The method of claim 1 wherein the network interface module is a firewall, and a user of the client computer adjusts firewall settings to set network policies based upon location.

4. The method of claim 1 wherein the step of associating the first netspec with a location comprises using a network probe to look up locations in a netspec database.

5. The method of claim 4 further comprising receiving modifications to the netspec database by a user of the client computer via a location setting module containing a user interface by which the user assigns a location to each of the one or more netspecs or changes an existing location associated with each of the netspecs.

6. The method of claim 1 wherein the step of feeding the associated netspec/location pair to the network interface module comprises using a policy guide to feed the netspec/location pair to the network interface module on a real-time basis.

7. An apparatus for associating computer network interfaces with network policies, said apparatus comprising:
   a computer-readable storage medium storing executable software means comprising:
      means for analyzing one or more network interfaces associated with a client computer using a plurality of network detectors that each output a netspec comprising a first token that is a detector token having a static value that identifies a specific detector that created the netspec and a second token that is a value that the specific detector uses to uniquely identify the analyzed network interface;
      coupled to the analyzing means, means determining that a first detector outputted a first netspec for a particular analyzed network interface of the one or more network interfaces and that a second detector outputted a second netspec for the particular analyzed network interface;
      coupled to the analyzing means, means for determining that the first detector is more reliable in observing the particular analyzed network interface interfaces than is the second detector;
      coupled to the determining means, means for awarding a higher priority to the first netspec than to the second netspec in response to the first netspec being output by the first detector and the first detector being more reliable than the second detector;
      coupled to the awarding means, means for associating the first netspec that was awarded the higher priority with a location that is linked to one or more network policies designated by a user to be implemented for the location;
      coupled to the associating means, means for feeding the associated netspec/location pair to a network interface module to implement the one or more network policies designated for the location; and
   a processor configured to execute the software means stored by the computer-readable storage medium.

8. The apparatus of claim 7 wherein the network interface module is a module from the group of modules consisting of a firewall, a router, a sniffer, an intrusion detection module, a behavior blocking module, and a network communications module.

9. The apparatus of claim 7 wherein the network interface module is a firewall, and the network policies are implemented on a packet-by-packet basis.

10. The apparatus of claim 9 wherein locations are correlated with firewall settings on a distributed basis within the firewall.

11. The apparatus of claim 7 wherein the associating means further comprises:
    a netspec database associating the netspecs with the locations.

12. The apparatus of claim 11 further comprising, coupled to the netspec database, a location setting module adapted to enable a user of the client computer to associate the locations with the netspecs.

13. The apparatus of claim 7 wherein the feeding means comprises:
   a policy guide for associating netspecs with locations; wherein
   the network interface module implements the network policies based upon the locations fed to the network interface module by the policy guide.

14. The apparatus of claim 7 further comprising, coupled to the network interface module, a user interface adapted to enable a user of the client computer to associate the locations with the network policies.

15. At least one computer-readable non-transitory storage medium containing computer program instructions for associating computer network interfaces with network policies, said computer program instructions performing the steps of:
analyzing one or more network interfaces associated with a client computer using a plurality of network detectors,
   that each output a netspec comprising a first token that is a detector token having a static value that identifies a specific detector that created the netspec and a second token identifying that is a value that the specific detector uses to uniquely identify the analyzed network interface; determining that a first detector outputted a first netspec for a particular analyzed network interface of the one or more network interfaces and that a second detector outputted a second netspec for the particular analyzed network interface; determining that the first detector is more reliable in observing the particular analyzed network interface than is the second detector awarding a higher priority to the first netspec than to the second netspec in response to the first netspec being output by the first detector and the first detector being more reliable than the second detector; associating the first netspec that was awarded the higher priority with a location that is linked to one or more network policies designated by a user to be implemented for the location and feeding the associated netspec/location pair to a network interface module to implement the one or more network policies designated for the location.

16. The method of claim 1, wherein the client computer has a plurality of network interfaces and further comprising:
   analyzing each of the plurality of network interfaces using the plurality of network detectors; and
   analyzing the netspecs for the plurality of network interfaces output by the plurality of network detectors to identify a set of unique network interfaces;
   wherein interfaces in the set of unique network interfaces are associated with locations responsive to the priority order.

17. The method of claim 1, further comprising providing a user interface which allows a user of the client computer to set or change a priority order of of netspecs.

18. The method of claim 1, wherein associating further comprises:
   looking up a corresponding location identifier for the first netspec in a netspec database; and
   associating the particular analyzed network interface with the location identified by the corresponding location identifier for the first netspec.

19. The method of claim 1, wherein the network policies differ for different locations.

* * * * *

UNITED STATES PATENT AND TRADEMARK OFFICE
CERTIFICATE OF CORRECTION

| | | |
|---|---|---|
| PATENT NO. | : 7,870,297 B1 | Page 1 of 1 |
| APPLICATION NO. | : 10/826468 | |
| DATED | : January 11, 2011 | |
| INVENTOR(S) | : Peter Linhardt | |

It is certified that error appears in the above-identified patent and that said Letters Patent is hereby corrected as shown below:

Column 8, line 33, after "interface," delete "interfaces".

Column 9, line 14, after "associate," delete "the".

Column 9, line 15, after "with," delete "the".

Column 10, line 23, after "order," delete "of".

Signed and Sealed this
Twenty-third Day of August, 2011

David J. Kappos
*Director of the United States Patent and Trademark Office*